United States Patent [19]
Manwaring

[11] Patent Number: 5,934,733
[45] Date of Patent: Aug. 10, 1999

[54] EXTRUDED INSTRUMENT PANEL STRUCTURE

[75] Inventor: David Henley Manwaring, Warren, Mich.

[73] Assignee: General Motors Corporation, Detroit, Mich.

[21] Appl. No.: 08/993,338

[22] Filed: Dec. 19, 1997

[51] Int. Cl.$^6$ .................................................. B62D 25/14
[52] U.S. Cl. ..................... 296/72; 296/203.02; 280/752; 280/779
[58] Field of Search .............................. 296/70, 72, 192, 296/194, 203.02; 180/90; 280/779, 752; 248/223.41

[56] References Cited

U.S. PATENT DOCUMENTS

| | | | |
|---|---|---|---|
| 3,784,223 | 1/1974 | Hass et al. ............................. | 180/90 X |
| 3,930,664 | 1/1976 | Parr et al. ............................. | 180/90 X |
| 3,947,056 | 3/1976 | Schwanz ............................... | 180/90 X |
| 4,979,774 | 12/1990 | Houser ..................................... | 296/70 |
| 5,282,637 | 2/1994 | McCreadie .......................... | 296/194 X |
| 5,341,895 | 8/1994 | Grinberg et al. ..................... | 180/89.13 |
| 5,364,159 | 11/1994 | Kelman et al. ......................... | 296/192 |
| 5,387,023 | 2/1995 | Deneau ...................................... | 296/72 |
| 5,431,442 | 7/1995 | Tomita et al. .......................... | 280/752 |
| 5,636,937 | 6/1997 | Zemlicka .......................... | 248/223.41 |
| 5,806,916 | 9/1998 | Sinner et al. .............................. | 296/72 |

FOREIGN PATENT DOCUMENTS

| | | | |
|---|---|---|---|
| 404055173 | 2/1992 | Japan ....................................... | 296/196 |
| 405104984 | 4/1993 | Japan ....................................... | 280/752 |

OTHER PUBLICATIONS

Photographs of a Mercedes A class vehicle—3 pages.

*Primary Examiner*—Dennis H. Pedder
*Attorney, Agent, or Firm*—Charles E. Leahy

[57] ABSTRACT

An instrument panel structure for use in an vehicle having opposing side pillars, so called "A Pillars". The structure includes an extruded cross car beam having a plurality of radially spaced grooves transversely extending along the length. End caps having a receiving cavity adapted to receive the cross car beam suitably mounted to each of the pillars and the cross car beam is installed within each of the end caps. A plurality of extruded component brackets adapted to slidably engage within the cross car beam are positioned therein along the beam. The component brackets are fixed positionally along the beam by a plurality of fasteners, adhesive joining, or welding. Advantageously the instrument panel structure provides a flexible and efficient method of installing interior components within a right hand drive or left hand drive vehicle with the same structural elements.

1 Claim, 5 Drawing Sheets

EXTRUDED INSTRUMENT PANEL STRUCTURE

TECHNICAL FIELD

This invention relates generally to automotive interior structures and more particularly to an instrument panel beam having extruded features adapted to slidably mount interior components such as a steering column, an air bag, wiring harnesses, HVAC components, etc.

BACKGROUND OF THE INVENTION

It is well known in motor vehicles to provide an instrument panel beam extending transversely between the front pillars of an automotive body to provide structural rigidity to the vehicle and to mount interior components using mounting brackets, fasteners and other joining techniques.

Motor vehicles include a plurality of interior components mounted in the forward portion including steering column supports, driver and passenger knee bolsters, vehicle instruments, air bags, etc. The typical motor vehicle instrument panel structure is comprised of a metal beam assembly fastened to and extending between the front pillars of the vehicle. During manufacturing of a vehicle instrument panel structure, the beam is located in a fixture and locating tools are used to accurately and properly position component brackets to be attached to the beam. The components, typically extending from these brackets are located relative to the beam and are typically attached to the beam assembly using a plurality of fasteners. Existing designs also include tubular beams and stamped beams requiring brackets and multiple fasteners to securely fasten components in place along the beam. The location and attachment of component brackets in existing instrument panel structure designs is time consuming, expensive and fairly difficult to adapt to changing designs and alternate vehicle configurations. Such designs, because of the plurality of parts, fasteners and bracket, are also prone to problems caused by vibration, squeaks rattles and dimensional stability.

It is also known in the art to manufacture instrument panel beams from plastic and fiber reinforced plastic materials. Some such designs include pockets adapted to receive various components which are secondarily bonded or fastened therein. The pockets provided in this type design allows for easier location and placement of components however, as is a problem with the metal beams discussed above this type of design is also inflexible. Molds for manufacturing plastic beams are difficult and expensive to change as well as the requirement that each type of beam requires a separate mold.

SUMMARY OF THE INVENTION

This invention offers advantages and alternatives over the prior art by providing extruded elements to make up an instrument panel structure. Advantageously, the extruded elements allow for locating, positioning and mounting of various components.

These advantages are accomplished in a preferred form of the present invention by providing a vehicle instrument panel structure comprised of an extruded cross car beam having extruded features adapted to slidably receive components comprising the instrument panel of a vehicle. The extruded features in the beam include a plurality of transversely extending grooves. Advantageously, the extruded instrument panel includes extruded component brackets and die cast end caps adapted to interlock with the extruded features of the beam. The component brackets are assembled within the grooves of the cross beam and fixedly positioned by fasteners.

The extruded instrument panel of the present invention allows for rapid and simple component location obviating the need for the complicated build fixtures of the prior art. The grooves of the cross beam carry the gravitation and rotational loads of the components and when combined with the fastening of the components in position the present invention provides for an instrument panel that is virtually free of component vibration, squeaks and rattles. In addition, the use of an extruded cross beam allows for the positioning of interior components to accommodate either right or left hand drive vehicles.

The above discussed and other features and advantages of the present invention will be appreciated and understood by those skilled in the art from the following detailed description and drawings.

BRIEF DESCRIPTION OF THE DRAWINGS

The present invention will now be described, by way of example only, with reference to the accompanying drawings wherein like elements are numbered alike in the several Figures.

DESCRIPTION OF THE PREFERRED EMBODIMENT

Figure 1:
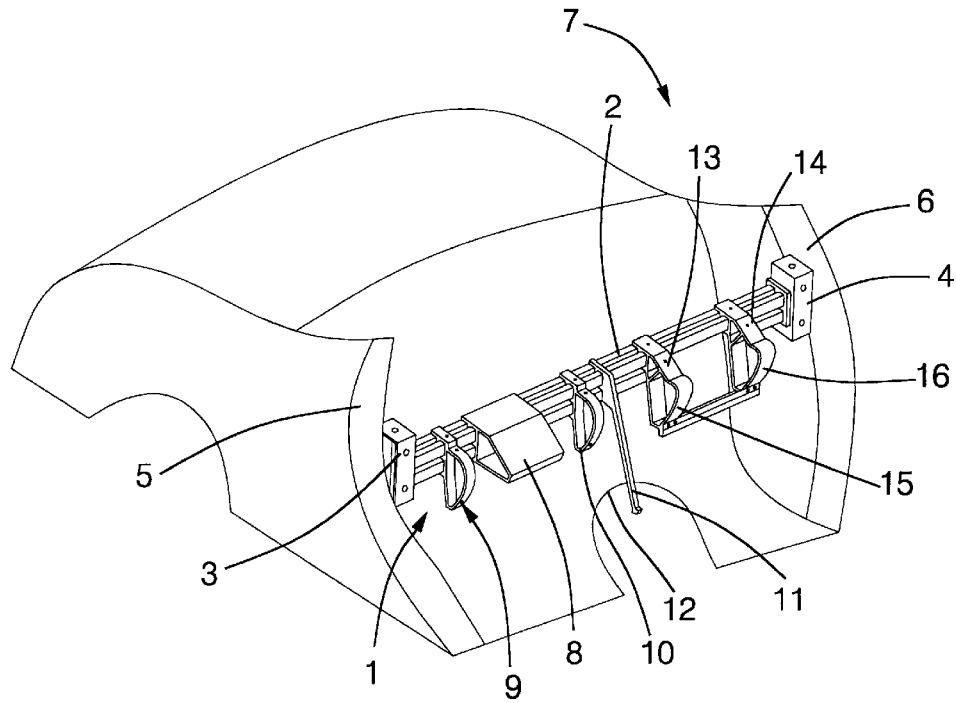
FIG. 1 is an isometric view of a partial left hand drive vehicle body showing the extruded instrument panel structure.

Referring to FIG. 1 there is shown an extruded instrument panel structure, generally designated as 1, includes a cross beam 2 attached to end caps 3, 4 which are suitably attached to side pillars 5, 6 located on opposite sides of a vehicle body 7.

The extruded instrument panel structure shown in FIG. 1 is that of a left hand drive vehicle and includes a steering column support bracket 8, driver knee bolster brackets 9, 10 located on the left side of body 7 as viewed in FIG. 1 and a center support bracket 11 suitably attached to a tunnel section 12 of the body to structurally support the cross beam. Located on the passenger side of vehicle body 7 shown on the right side of FIG. 1 are air bag attachment brackets 13, 14 and passenger knee bolster brackets 15, 16.

Figure 2:
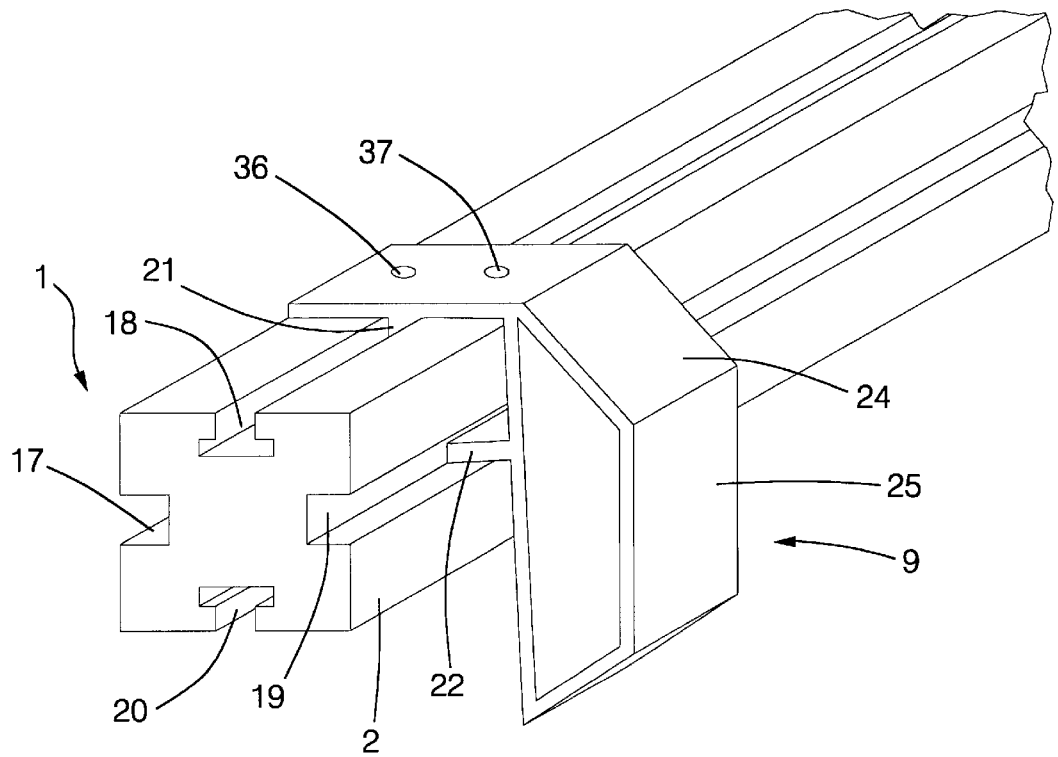
FIG. 2 is a partial isometric view of a cross car beam showing the extruded features of the beam and a bracket.
Figure 3:
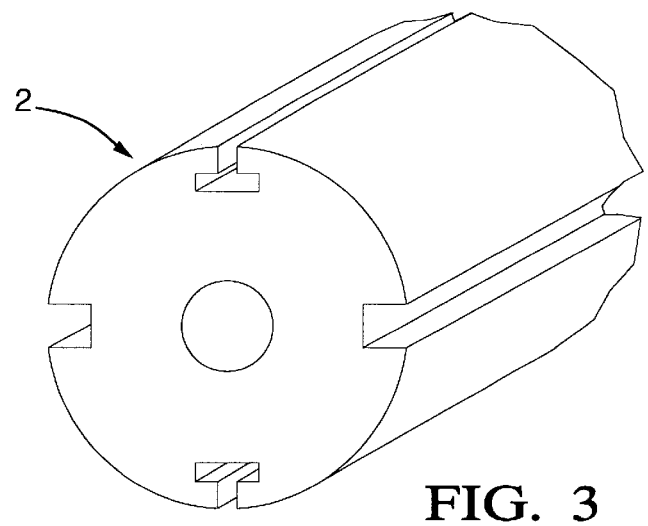
FIG. 3 is partial isometric view of an alternate cross car beam.
Figure 4:
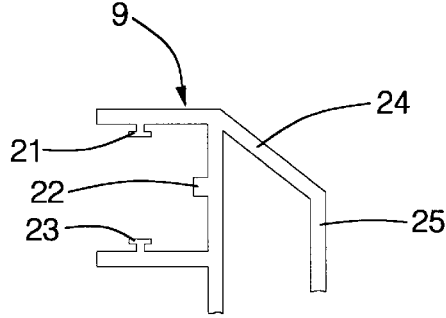
FIG. 4 is a partial isometric view of a knee bolster bracket showing extruded interlocking features.
Figure 5:
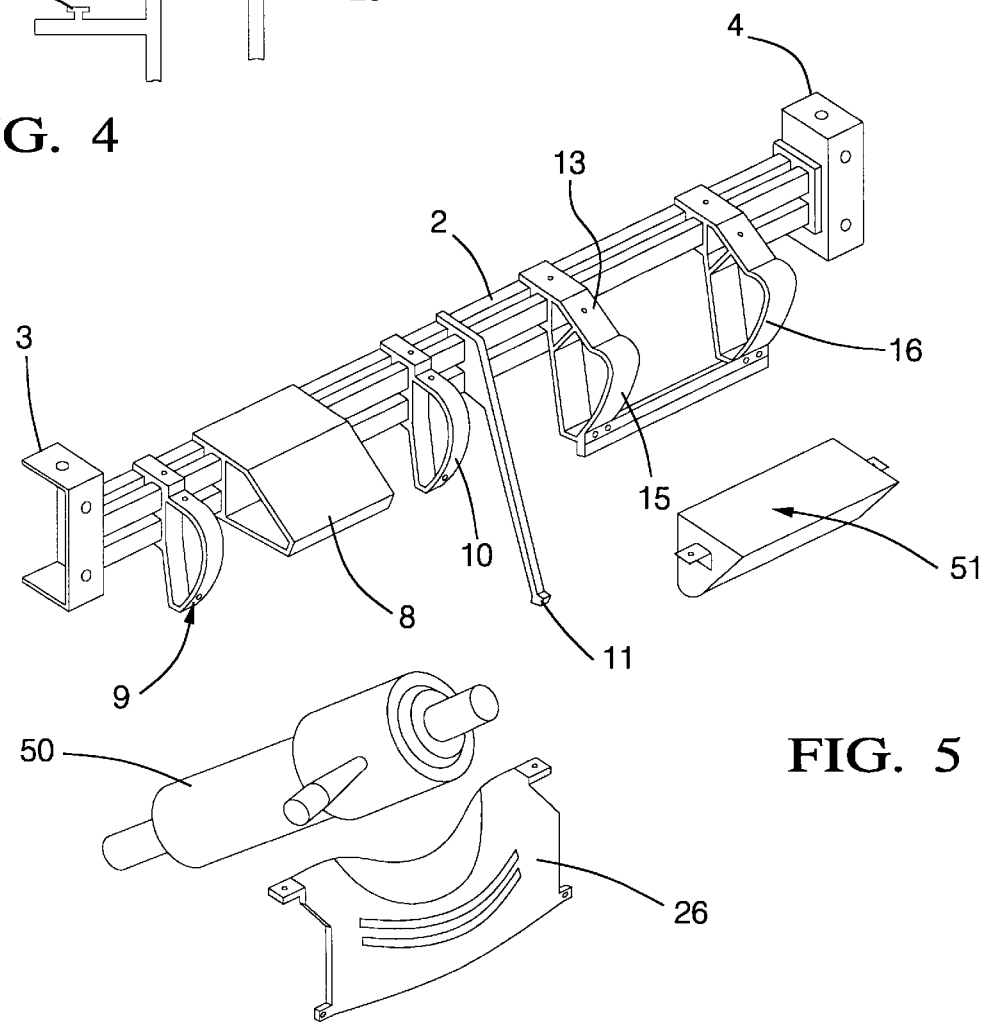
FIG. 5 is an isometric view of a partial left hand drive vehicle showing a completed instrument panel structure.
Figure 6:
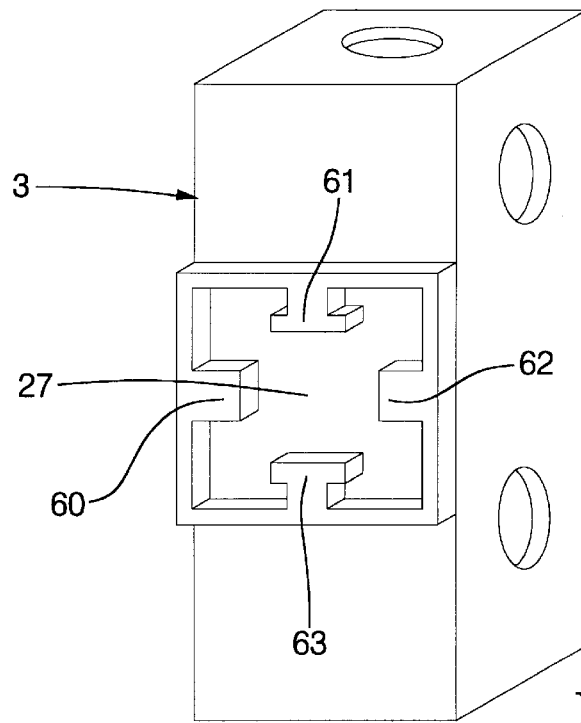
FIG. 6 is an isometric view of an end cap showing a receiving cavity.
Figure 8:
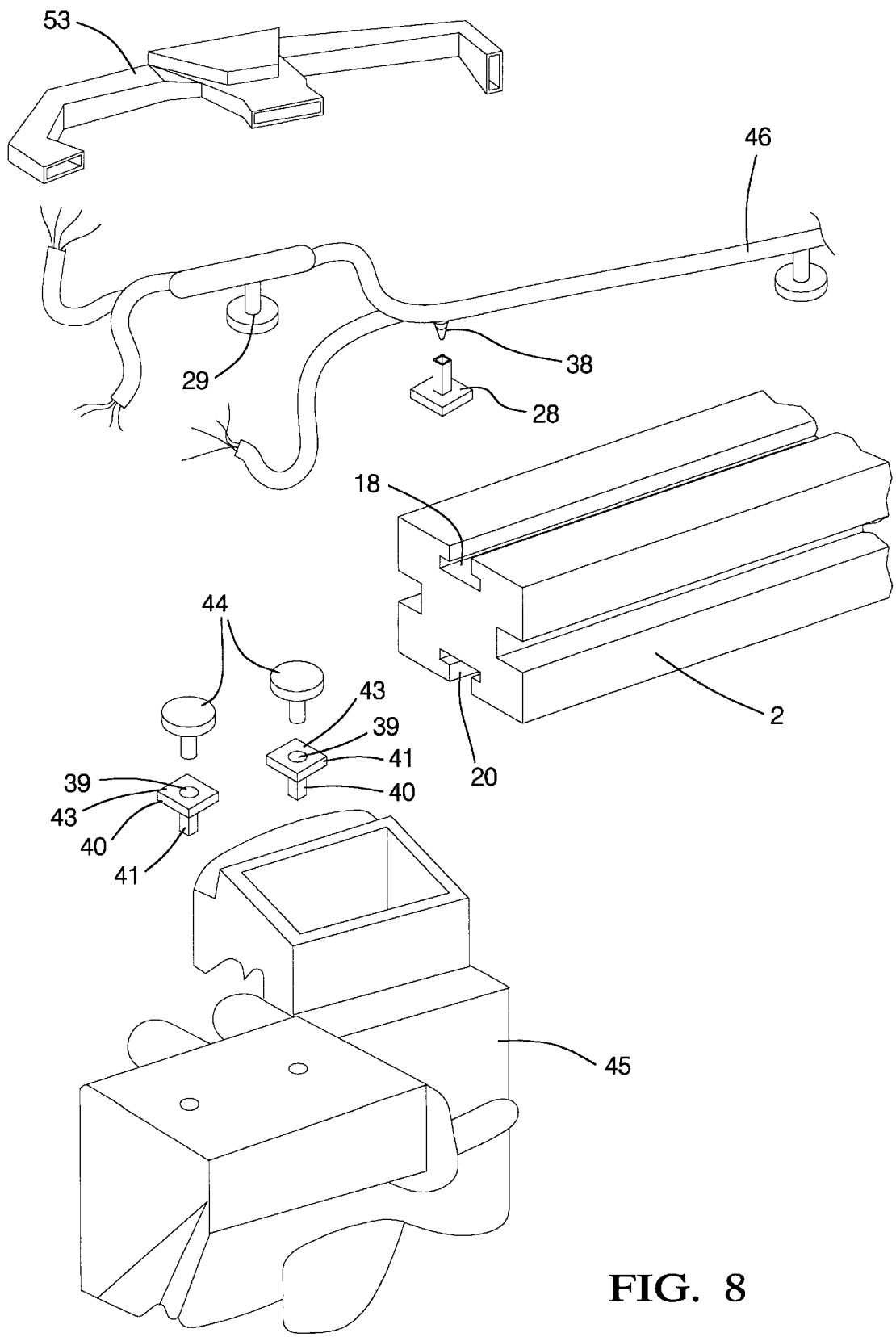
FIG. 8 is a partial isometric view of a cross car beam showing the installation of alternative mounting blocks.

The cross beam 2 is comprised of an extruded structure having transversely extending grooves 17, 18, 19, 20 as best shown in FIG. 2. In an exemplary embodiment, grooves 17, 19 comprise a pair of opposing guide grooves, and grooves 18, 20 comprise a pair of opposing retaining grooves, wherein the grooves are formed in surfaces of adjacent sides of cross beam 2. Each groove 17, 18, 19, 20 is generally formed perpendicular to the other grooves and as best shown in FIG. 2, retaining grooves 18, 20 comprise inverse T-shaped grooves which receive interlocking members of bracket 9 to interlock the same with cross beam 2. An alternative embodiment for cross beam 2 having a circular extruded section and similarly extruded interlocking features is shown in FIG. 3. The two beam shapes shown are merely examples as the present invention includes a variety of various shaped beams produced by the extrusion process. The grooves 17, 18, 19, 20 are preferably produced by a die using an extrusion manufacturing process. Driver knee bolster bracket 9 is preferably comprised of an extruded structure as best shown in FIGS. 2 and 4 and includes a set of extruded interlocking features 21, 22, 23 having the same cross sectional shape as grooves 18, 19, 20 respectfully to mount the bracket in sliding engagement with the beam. Extruded interlocking features 21, 22, 23 function as interlocking tabs which extend from the body of bracket 9 and slidably engage a similarly shaped guide groove or retaining groove of cross beam 2. Bracket 9 further includes component mounting faces 24, 25 adapted to mount driver knee bolster 26 as best shown in FIG. 5. Brackets 8 and 10–16 include similar extruded interlocking features for mounting in sliding engagement with cross beam 2 and include similar mounting faces adapted to the particular component intended for mounting thereon. For example, steering column 50 mounts to bracket 8, airbag 51 mounts to brackets 13, 14, passenger knee bolster 52 mounts to brackets 15, 16. The present invention also includes mounting brackets for other components such as wiring harness 46, HVAC module 45 and duct 53 as best shown in FIG. 8. End caps 3, 4 are preferably die cast elements manufactured from either aluminum or magnesium and include a receiving cavity 27 disposed therein having a similar cross sectional shape as cross beam 2 as best shown by end cap 3 depicted in FIG. 6. The cross sectional shape of receiving cavity 27 is complementary to the cross sectional shape of cross beam 2 to permit the ends of cross beam 2 to be interlockingly received within receiving cavity 27. More specifically, end caps 3, 4 each include at least one lug 60. Each lug 60 is preferably integrally formed in each of end cap 3, 4, wherein lug 60 projects inwardly to form, in part, the cross-sectional shape of receiving cavity 27. It being understood that each lug 60 will have a cross-sectional shape which complements a corresponding, transversely extending groove 17, 18, 19, or 20 (shown in FIG. 2) so that lug 60 is received within the corresponding groove and slidably engages the same to interlock the cross beam 2 with each end cap 3, 4. As shown in FIG. 6, an exemplary end cap 3 includes lugs 60, 61, 62, 63 which slidably engage transversely extending grooves 17, 18, 19, 20 of cross beam 2 (FIG. 2).

During the build up of an instrument panel structure the cross beam 2 is temporarily mounted within a simple steel build fixture (not shown). The components referred to above are attached to the appropriate mounting brackets of the present invention and are subsequently mounted to the cross beam by sliding them on in successive operations. The grooves in the beam and the extruded interlocking features in the brackets position the brackets and components in the correct spatial orientation and simple location features included in the build fixture aid an operator in selecting the proper position for a specific component along the length of the cross beam. Once properly located, a bracket for the component is positionally fixed to the cross beam by a plurality of mechanical fasteners 36, 37 as best shown in FIG. 2. The groove and extruded interlocking feature arrangement of the present invention provides both rotational and load bearing support for the component while the mechanical fasteners resists transition movement as well as reducing or eliminating component vibration, squeaks and rattling. Alternate methods of fixing the bracket to the cross beam include interference fits between the brackets and the cross beam, adhesives and welding. After all of the components have been attached to the cross beam, end caps 3, 4 are fixed to the ends of the cross beam by methods similar to those discussed hereinabove for positionally fixing the components. The completed instrument panel is then installed in a vehicle body 7 by suitable attaching end caps 3,4 to the side pillars as best shown in FIGS. 1 and 5.

Figure 7:
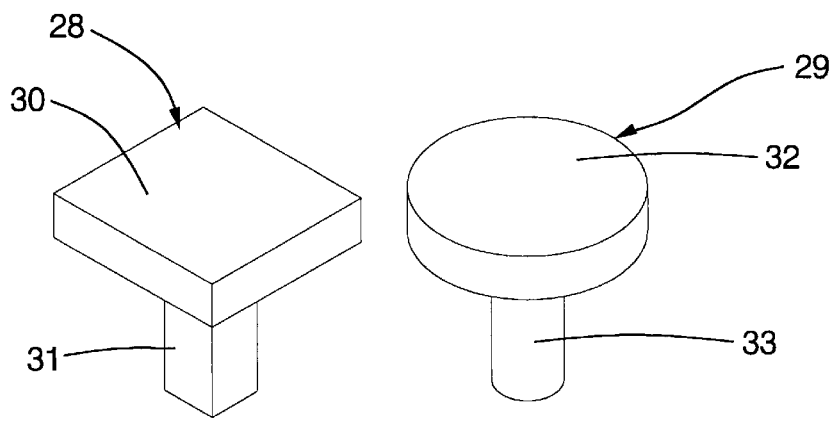
FIG. 7 is an isometric view of alternate mounting blocks.
Figure 9:
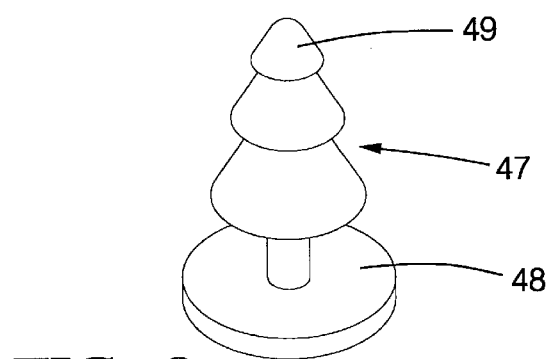
FIG. 9 is an isometric view of alternate conically serrated push on fastener mounting block.

Alternative mounting features include mounting blocks 28, 29 as best shown in FIG. 7 providing for the direct mounting of components as well as an alternative method of positionally fixing components mounted to brackets. Mounting block 28 includes a body portion 30 and a leg portion 31 having generally the same shape as grooves 18, 20 in cross beam 2. In an embodiment the mounting blocks 28, 29 include internal threads for engaging a threaded fastener 38 in a component, for example wiring harness 46 and subsequently installed in groove 18 of cross beam 2 as best shown in FIG. 8. Another embodiment of mounting features of the present invention includes mounting block 39 comprising a body 40, a leg 41 having a through hole 42 passing therethrough and a countersunk portion 43 disposed in the body portion. As best shown in FIG. 8 countersink fasteners 44 are installed within mounting blocks 39 and engaged within a component, for example HVAC module 45 and subsequently installed within groove 20 of cross beam 2. It is important to note that the overall height of mounting block 28 is less than the depth of groove 18 and once inserted within either groove 18 or 20 mounting block 28 resists rotation and provides clamping force between the bracket 9, mounting block 28 and cross beam 2 to positionally fix the bracket 9 and the component mounted thereon. Alternatively, mounting block 29 includes a round body portion 32 sized to fit within grooves 18, 20 and an internally threaded leg portion 33 to receive a threaded fastener. Round body 32 allows for rotation of mounting block 29 within groove 18, 20 to facilitate certain types of component positioning and locating. An additional alternative mounting feature includes conically serrated push-on fastener 47 as best seen in FIG. 9 comprising a body portion 48 adapted to slidably engage within groove 18 of cross beam 2 and a serrated portion 48 adapted to snap engage within a component, for example wiring harness 46.

Figure 10:
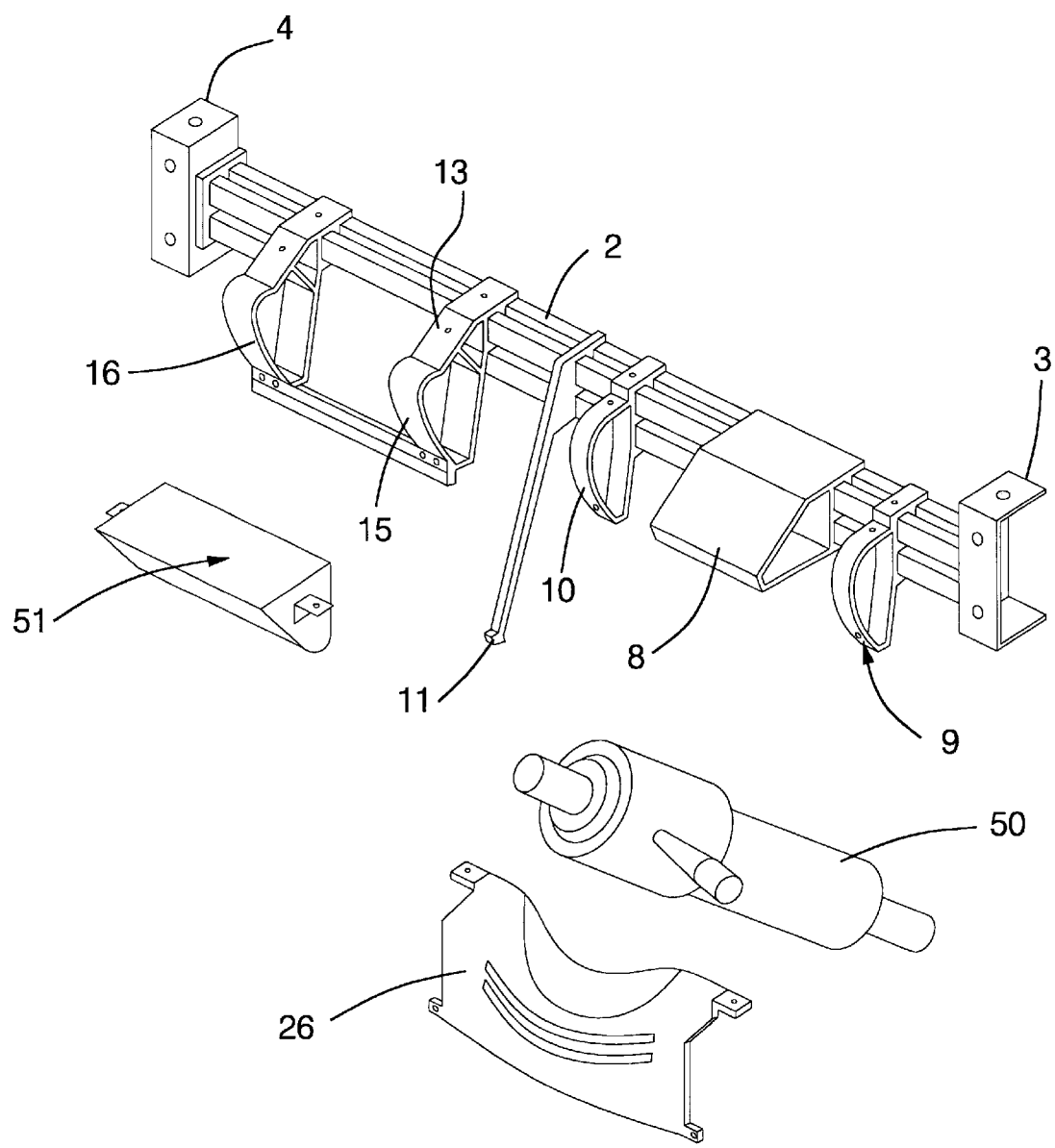
FIG. 10 is an isometric view of a partial right hand drive vehicle showing a completed instrument panel structure.

The flexibility of the extruded instrument panel structure is best shown in FIG. 10 where a right handed drive vehicle, generally designated as 34, illustrates instrument panel structure 35 and includes the same elements as a left hand drive vehicle, as best shown for comparison purposes in FIG. 1, arranged in mirror image. The driver's side as depicted in FIG. 10 is on the right side of the figure and includes steering column support bracket 8 and driver's side knee bolster brackets 9,10. The passenger side, the left side of FIG. 10, includes air bag support brackets 13, 14 and passenger side knee bolster brackets 15,16. The instrument panel structure 35 shown in FIG. 10 utilizes the exact same brackets and end caps as the instrument panel structure 1 located in different positions by a different build fixture.

The instrument panel structure of the present invention advantageously also allows for changes in widths of various models of vehicles by altering the length of the extruded section of cross beam. Another advantage of the present invention include rapid prototyping of vehicle interiors by allowing for the sliding of installed components along the cross beam for ergonomictric optimization. Yet another advantage of the present invention is the ability to rapidly develop extruded cross beams and extruded brackets having different shapes and features because of the relatively inexpensive and simplicity of extrusion dies.

It will be understood that a person skilled in the art may make modifications to the preferred embodiments shown herein within the scope and intent of the claims. While the present invention has been described as carried out in a specific embodiment thereof, it is not intended to be limited thereby but is intended to cover the invention broadly within the scope and spirit of the claims.

What is claimed is:

1. A support structure for use in an instrument panel structure in a vehicle having a body and a pair of side pillars located on opposite sides of the body, the support structure comprising:

a cross beam having a length and a predetermined cross section and further including:

a pair of opposing, transversely extending guide grooves defined therein and a pair of opposing retaining grooves defined therein, and a pair of end caps, each end cap having a receiving cavity, each end cap being mounted to one of the side pillars with the respective ends of the cross beam disposed within the receiving cavity of each end cap, the receiving cavity having a cross section complementary to the predetermined cross section the cross beam, wherein the end caps receive the ends of the cross beam in an interlocking manner.

* * * * *